June 5, 1934.  A. R. NISBET  1,961,447
MECHANICAL COTTON PICKER
Filed Feb. 23, 1932  4 Sheets-Sheet 1

INVENTOR.
A. R. Nisbet
BY
ATTORNEYS.

June 5, 1934.  A. R. NISBET  1,961,447
MECHANICAL COTTON PICKER
Filed Feb. 23, 1932    4 Sheets-Sheet 4

INVENTOR.
A. R. Nisbet
BY
ATTORNEYS.

Patented June 5, 1934

1,961,447

UNITED STATES PATENT OFFICE

1,961,447

MECHANICAL COTTON PICKER

Alexander R. Nisbet, Plainview, Tex.

Application February 23, 1932, Serial No. 594,731

6 Claims. (Cl. 56—12)

This invention relates to a cotton picker that will pick cotton from the bolls on the plant without removing the bolls in which it grows; and without damage to the plant or bolls not yet open; or to the fruit that is green and immature.

This invention relates to a cotton picker that is different from those that remove the bolls with the cotton and separate the cotton from the bolls thereafter.

This invention relates to a mechanical cotton picker wherein the force of an air blast and the resistance of a retaining wall, better described as picker roll, and as illustrated in the drawings hereto attached, co-operate to grip the cotton while it is in the bolls, and while it is thus held it is pulled from the bolls by the rotary motion of the picker roll. The picker roll has a diameter greater than the width of the air blast and quickly carries the cotton out of the air blast where it is released and falls to the floor to be carried to a receptacle for holding the picked cotton. The diameter of the roll, however, may be increased or decreased in the construction of any of the cotton pickers embodying this invention, and in accordance with the principle stated.

In order to operate this cotton picker it is necessary to transport it along a row of cotton while it is made to operate as hereinafter described. The manner of transportation or source of power is immaterial to the invention. For convenience I show it mounted on a row crop tractor by which it is carried, and the power for its operation supplied by the tractor motor.

In order to fully describe this invention, I append herewith four sheets of drawings containing Figures 1, 2, 3 and 4.

Figure 4:
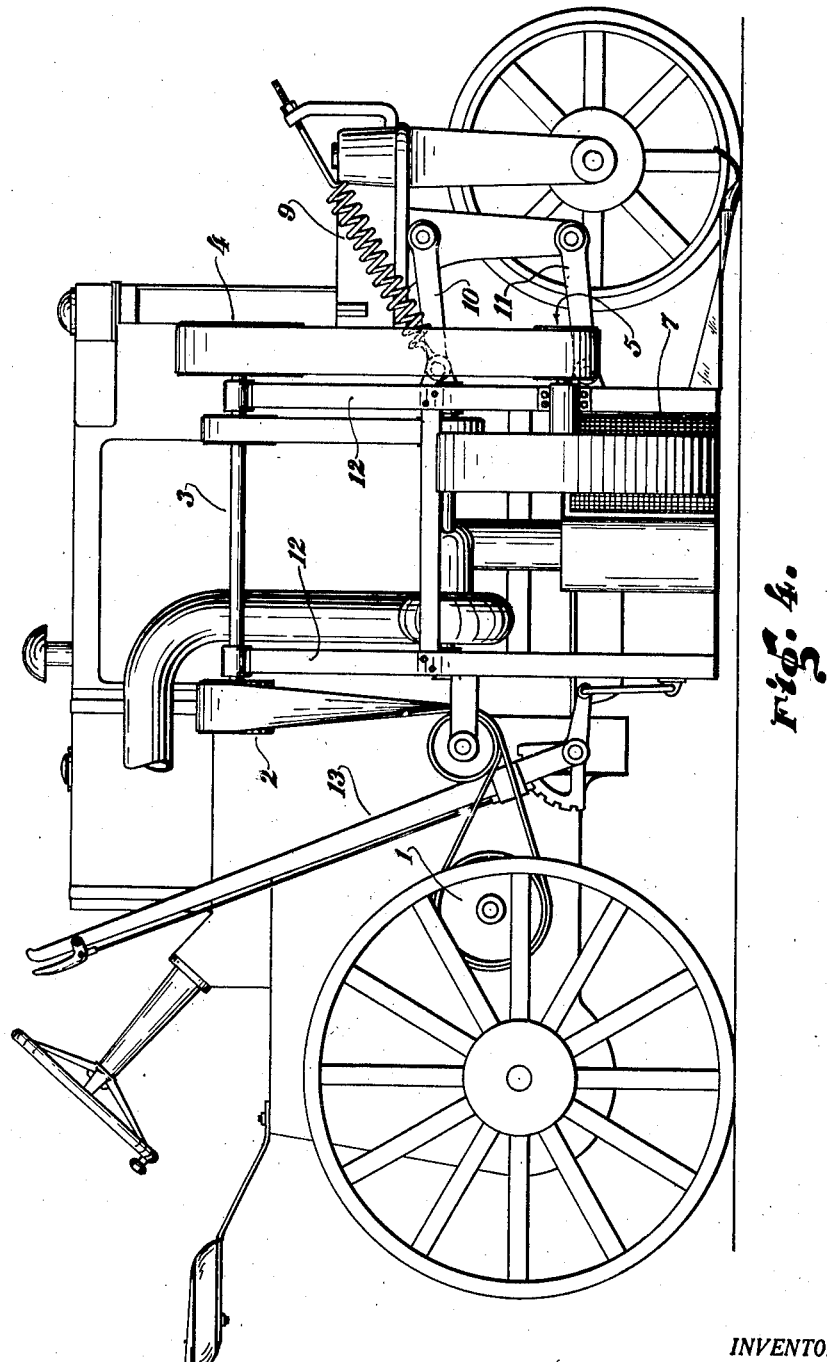

In Figure 4 the invention is shown mounted on the side of a row crop tractor.

The tractor is shown only in outline and needs no explanation. No. 1 is a belt pulley on the power take-off shaft, and is belted upward to a pulley, No. 2, on a counter shaft, No. 3, mounted parallel to the tractor, and extending forward over the picker. No. 4 is a pulley on No. 3, and belted down to No. 5, which is the pulley on No. 6, which is a rotary fan for generating wind current which strikes the cotton and forces it against No. 7, which is the picker roll mentioned above. As shown here the outer surface of the picker roll is composed of woven wire with three-quarters of an inch to each mesh; but for efficiency it is best to vary the size of the mesh to suit different conditions as found in the field.

Figure 2:
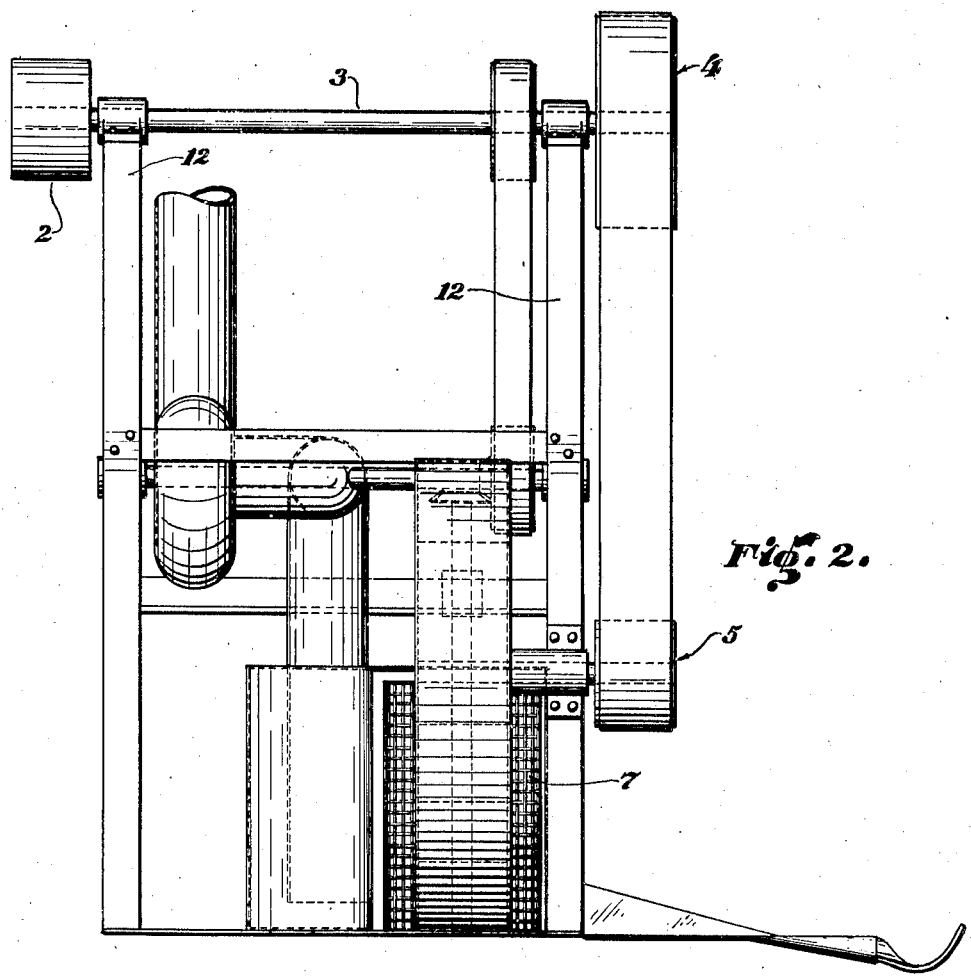
Figure 2 is a top view of the fan and picker roll.

Figure 2 is a view similar to Figure 4, but on an enlarged scale.

No. 7 is cylindrical in form, mounted on a shaft through its center so as to be held in a vertical position, and in order that it may be rotated. A pinion on its upper end meshes into a gear on a horizontal shaft that receives power from the countershaft No. 3. The shape or size of No. 7 is immaterial to this invention so long as it performs the function of a retaining wall moving through an air blast to pull cotton from the bolls as herein described. I have made it in the shape of a belt around two centers, presenting a flat surface to the air blast which makes it very effective. Small teeth or hooks may also be added to the surface for work after the cotton plant is dead, and no damage can be done to the plant.

Figure 1:
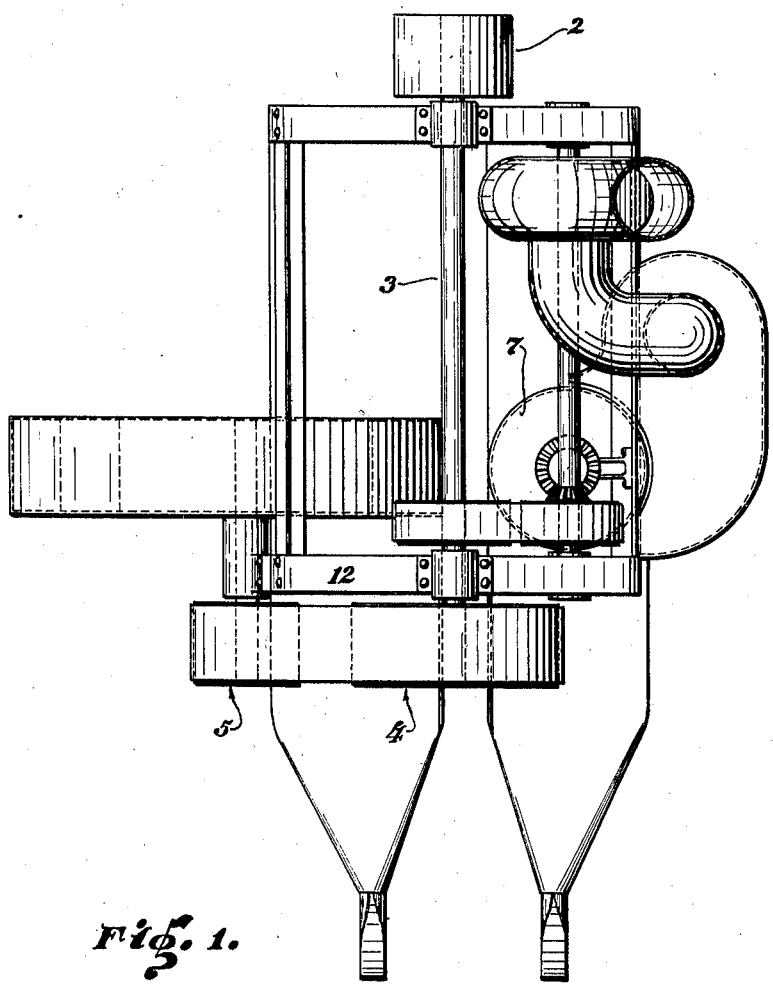
Figure 1 is a side elevational view of the picker attached to a tractor.

In Figure 1, is a view looking down on the fan, No. 6, and the picker roll, No. 7, showing a boll of cotton in the process of being picked. This illustrates how the blast of air from the fan against the cotton, forces it against the picker roll. The air having free passage through the picker roll, pushes the cotton partially into the meshes of the picker roll enabling it to take hold of the cotton with sufficient force to pull it from the bolls.

This picker is mounted on the tractor in a flexible manner for being adjusted up and down to suit the ground, and for transportation over rough places.

No. 8 shown in each of the figures is a small centrifugal fan for suction, and discharge pipes for gathering the cotton as it falls to the floor from No. 7, and for conveying it to the receptacle. In Figure 1, a spring for carrying the weight of the picker is shown at No. 9. Nos. 10 and 11 are parallel arms hinged to the tractor at one end, and to the picker at the other end. These are in pairs and are shown also in Figure 2. They hold the picker in an upright position and in line for operation. No. 12 are the channel posts that form the picker frame. No. 13 is an adjusting lever. No. 3 is equipped with two universal joints to compensate for the adjustments of the picker.

Figure 3:
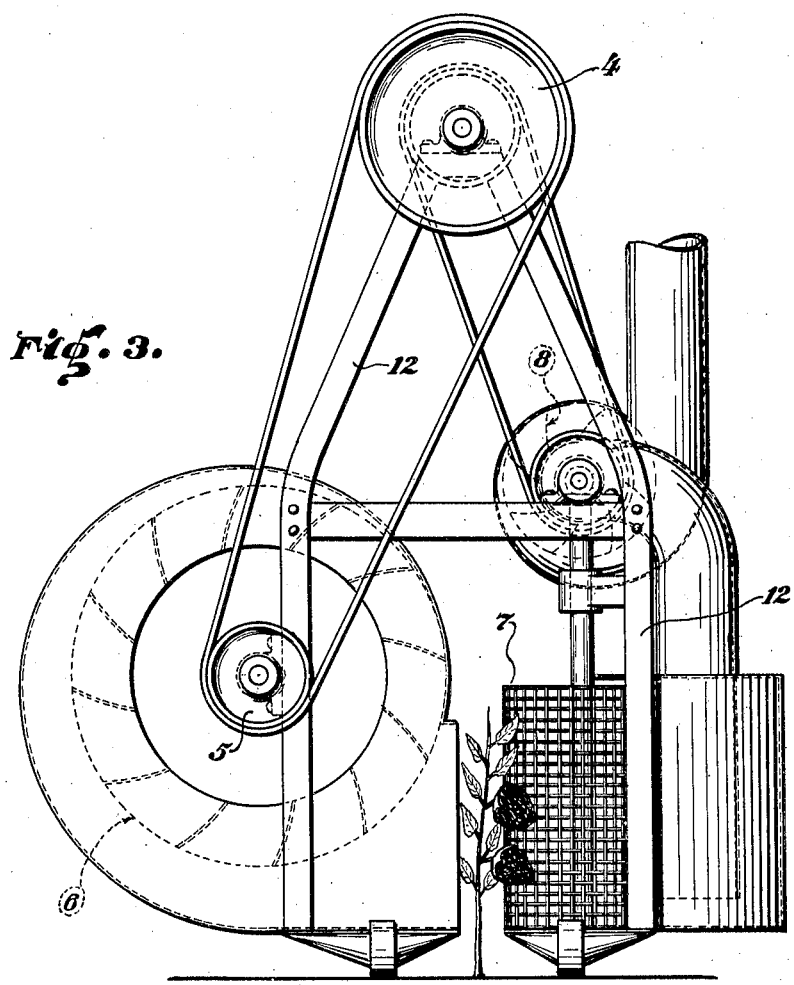
Figure 3 is a front view of the picker.

Figure 3 is an enlarged transverse detail elevational view, showing the picker in position on the row, with a stalk of cotton between the fan and the picker roll. The small arrow heads show the direction of the wind from the fan, forcing the cotton against the picker roll.

I am aware that there are a great variety of shapes of fans and cylinders with pistons that may be arranged to produce the necessary air current to pick the cotton, and I am claiming no invention on the kind of fan or mechanism used in producing such air current.

I do claim:

1. In combination with a vehicle, a mechanical cotton picker, said picker including a fan with a casing for creating an air blast, a rotating foraminous picker element against which the blast is directed, said picker element spaced from the fan, and means for operating said fan and picker roll.

2. A mechanical cotton picker comprising a fan for creating an air blast, a casing for directing the air blast against a picker member, a rotatable mesh picker member spaced from said fan and casing to permit a cotton plant to pass between the member and casing, and air suction means for removing cotton deposited by the picker member.

3. A mechanical cotton picker comprising a mesh picker member, means for rotating the picker member, a casing and a fan secured within said casing for causing an air blast to pass through said picker member, the cotton being forced partially into the meshes of the picker, pulled from the cotton bolls and dropped therefrom.

4. A mechanical cotton picker comprising a movable supported frame, a casing supported by said frame, a fan for creating an air blast against a picker member, a mesh picker member spaced from the fan, and an air suction means for removing cotton deposited by the picker member.

5. A mechanical cotton harvester comprising an adjustable frame, a mesh picker element rotating into and out of a casing, a fan within a fan casing, said fan casing having a discharge opening directed toward the picker element, that portion of the picker element in approximate line with the discharge opening being of larger dimensions than the space area defined by the discharge opening of the fan casing.

6. A process of picking cotton comprising the steps of directing an air blast against a cotton plant to force the bolls thereof against a mesh picker, revolving the picker to remove the cotton from the bolls, revolving the picker to release the cotton adhering thereto and to permit the cotton to be discharged from the picker.

ALEXANDER R. NISBET.